United States Patent
Bradley et al.

(10) Patent No.: US 9,621,420 B2
(45) Date of Patent: Apr. 11, 2017

(54) NETWORK DEVICE CONFIGURATION MANAGEMENT

(71) Applicant: International Business Machines Corporation, Armonk, NY (US)

(72) Inventors: Ivor G. Bradley, Belfast (GB); Timothy R. Croy, Ballymena (GB); Trevor Graham, Hillsborough (GB); Kevin M. Hamilton, Belfast (GB); David J. Wallace, Belfast (GB)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 14/367,130

(22) PCT Filed: Dec. 10, 2012

(86) PCT No.: PCT/IB2012/057133
§ 371 (c)(1),
(2) Date: Jun. 19, 2014

(87) PCT Pub. No.: WO2013/093702
PCT Pub. Date: Jun. 27, 2013

(65) Prior Publication Data
US 2014/0379881 A1 Dec. 25, 2014

(30) Foreign Application Priority Data
Dec. 21, 2011 (GB) .................. 1122037.3

(51) Int. Cl.
H04L 12/24 (2006.01)

(52) U.S. Cl.
CPC ........ H04L 41/0813 (2013.01); H04L 41/082 (2013.01); H04L 41/0853 (2013.01);
(Continued)

(58) Field of Classification Search
CPC combination set(s) only.
See application file for complete search history.

(56) References Cited

U.S. PATENT DOCUMENTS 6,516,347 B1   2/2003   Nakamura
6,959,329 B2   10/2005  Thakor
(Continued)

FOREIGN PATENT DOCUMENTS

CN   1364262 A   8/2002
GB   2477921 A   8/2011
(Continued)

OTHER PUBLICATIONS

UK Intellectual Property Office Search Report, dated Apr. 12, 2012, regarding Application No. GB1122037.3, 6 pages.
(Continued)

*Primary Examiner* — Saket K Daftuar
(74) *Attorney, Agent, or Firm* — Nolan M. Lawrence

(57) ABSTRACT

Method and system are provided for network device configuration management. The method includes: receiving a set of user commands for configuration of a network device; retrieving a syntactic model of a network device configuration interface for a network device type and generating a modelled configuration of a current configuration of the network device; predicting the effect of the user command on the modelled configuration to generate a predicted modelled configuration; and applying rules for a user and/or network device type to determine if the command is permitted based on the predicted modelled configuration of the network device. Predicting the effect of the user command predicts in near real-time the effect on the network device configuration of a command that the user enters.

17 Claims, 4 Drawing Sheets

(52) U.S. Cl.
CPC ........ *H04L 41/147* (2013.01); *H04L 41/0893* (2013.01); *H04L 41/22* (2013.01)

(56) References Cited

U.S. PATENT DOCUMENTS

| | | | |
|---|---|---|---|
| 7,065,562 | B2 | 6/2006 | Courtney |
| 7,200,548 | B2 | 4/2007 | Courtney |
| 7,249,170 | B2 | 7/2007 | Tindal et al. |
| 7,461,158 | B2 | 12/2008 | Rider et al. |
| 7,487,231 | B2 | 2/2009 | Brown et al. |
| 7,693,699 | B2 | 4/2010 | Singh et al. |
| 7,949,744 | B2 | 5/2011 | Kortright |
| 7,953,580 | B2 | 5/2011 | Cleary et al. |
| 8,116,439 | B1* | 2/2012 | Runcie .................... H04M 3/20 379/201.1 |
| 2004/0078457 | A1 | 4/2004 | Tindal |
| 2004/0122645 | A1 | 6/2004 | Shevenell et al. |
| 2005/0004942 | A1 | 1/2005 | Madsen et al. |
| 2005/0044451 | A1* | 2/2005 | Fry ..................... G06F 11/3485 714/38.1 |
| 2005/0154580 | A1* | 7/2005 | Horowitz .............. G06F 17/271 704/9 |
| 2010/0025753 | A1 | 2/2010 | Terai |
| 2010/0257253 | A1* | 10/2010 | Saha ................... G06F 9/44589 709/217 |
| 2011/0231532 | A1 | 9/2011 | Nishimura et al. |
| 2012/0303758 | A1* | 11/2012 | Anbarasan .......... H04L 41/0266 709/218 |

FOREIGN PATENT DOCUMENTS

| | | |
|---|---|---|
| JP | 2000209239 A | 7/2000 |
| JP | 4620784 B2 | 1/2011 |
| JP | 2011199623 A | 10/2011 |
| WO | 2004090672 A2 | 10/2004 |
| WO | 2011034457 A1 | 3/2011 |
| WO | 2011088898 A1 | 7/2011 |

OTHER PUBLICATIONS

International Search Report and Written Opinion, dated Feb. 26, 2013, regarding Application No. PCT/IB2012/057133, 7 pages.

"IBM Tivoli Netcool Configuration Manager IDT Guide; Document Revision R2" International Business Machines Corporation, Jul. 20, 2010, 19 pages.

IBM, "IBM Tivoli Netcool Configuration Manager (ITNCM) Integration Roadmap," IBM Tivoli and Intelliden, IBM Software Group, 19 pages, © 2010 IBM Corporation.

GB Examination Report for Application No. GB1410603.3, Dated Jul. 9, 2014, 6 pages.

GB Examination Report for Application No. GB1410603.3, Dated Sep. 1, 2014, 4 pages.

GB Application No. 14106033, Response to Examination Report, Dated Aug. 12, 2014, 41 pages.

GB Application No. 14106033, Response to Examination Report, Dated Sep. 24, 2014, 63 pages.

GB Application No. 14106033, Notification of Grant, Dated Oct. 21, 2014, 2 pages.

* cited by examiner

NETWORK DEVICE CONFIGURATION MANAGEMENT

CROSS-REFERENCE TO RELATED APPLICATIONS

This application is a continuation of and claims priority under 35 U.S.C. §371 to International Application No. PCT/IB2012/057133 filed on Dec. 10, 2012, which claims priority to United Kingdom Patent Application No. GB 1122037.3 filed on Dec. 21, 2011. The contents of both aforementioned applications are incorporated herein by reference.

TECHNICAL FIELD

This invention relates to the field of network device configuration management. In particular, the invention relates to management of command updates to network device configurations.

BACKGROUND ART

Studies indicate that over 60% of network outages are caused by mistakes made by users whilst changing network element configurations. This is exacerbated by the syntactically complex command-line interfaces used by many network elements. Existing approaches to reducing user error include: provision of help text within the interface itself; auto-completion of commands as the user types on the interface; and restriction of the set of commands which the user may issue based on their security permissions. However, none of these approaches is complete and errors are still very common, so additional mechanisms which might further reduce the number of mistakes are required.

An example network configuration manager is the IBM Tivoli Netcool Configuration Manager (ITNCM) (IBM, Tivoli, and Netcool are trademarks of International Business Machines Corporation). The function of the ITNCM application is to allow users to configure network elements easily, reliably, and repeatedly. The mechanisms which ITNCM uses to achieve this are primarily built around the use of a model of the device configuration interface. The described method and system build upon and extend existing network configuration managers such as ITNCM.

A network element is a device which forms part of a communications network. Every network element has a configuration, which is a series of internally-held settings that influence how it operates. The configuration usually has a human-readable representation which the device can provide on demand, often as plain text. The network element also has a configuration interface, which is a mechanism by which the configuration can be altered, often by way of plain text commands issued on a command-line interface (CLI). In order to set up and manage a network element, the human operator must understand how commands entered on the configuration interface act to influence the configuration.

The ITNCM system contains a library of models for different devices (each model is specific to a type or family of devices from one vendor). The model has syntactic, behavioural, and rendering aspects. The existing ITNCM process retrieves the current configuration from the device, and using the syntactic part of the model, it converts the native configuration into an internal representation of the configuration (an extended markup language (XML) structure) for easier manipulation within the application. The rendering aspects of the model are used by the graphical user interface (GUI) of the system to display the configuration to the user with appropriate annotations such as a visual indication of the allowable range for a parameter. The user can make changes to the configuration by manipulating the GUI representation or by applying a previously saved configuration template, and then request that change to be applied to the device. Using the syntactic and behavioural aspects of the model, ITNCM converts the changes that have been applied to the internal representation of the configuration into a series of commands that can be issued to the device, in order to influence its configuration to match the ITNCM internal representation.

It is desirable to reduce the potential for human error in configuring a device by restricting the ways in which certain users can change device configurations—stopping less experienced network engineers from issuing the potentially most destructive commands. This can be achieved today in ITNCM by blocking access to certain parts of the configuration when it is rendered on the GUI. However, in customer engagements it has been found that network engineers also demand access directly to the command line interface (CLI).

ITNCM provides command line access by way of an integrated device terminal (IDT), within which there is a mechanism to restrict the commands that a user can submit to a device. However, this is based on simplistic text string matching to block commands, and puts virtually all the work to define appropriate text filters onto the ITNCM administrator. The current approach requires the user to have detailed knowledge of the command syntax for every device type and requires the construction of complex sequences of regular expression pattern matching.

International patent application, publication number WO 2011/088898 (FEDOR, Szymon, et al (VERIFICATION OF COMPATIBILITY AMONG TELECOMMUNICATION NETWORK FEATURES, Jul. 28, 2011), discloses a method and apparatus for assessing the compatibility of a selected network feature with the network features of an existing telecommunications network comprises providing an abstraction of each network feature in the form of a data model which defines the relationships between any network elements or nodes, software elements and software features required for each network feature.

Therefore, there is a need in the art to address the aforementioned problem.

SUMMARY OF INVENTION

According to a first aspect of the present invention there is provided a method for network device configuration management, comprising: receiving a set of user commands for configuration of a network device; retrieving a syntactic model of a network device configuration interface for a network device type and generating a modelled configuration of a current configuration of the network device; predicting the effect of the user commands on the modelled configuration to generate a predicted modelled configuration; and applying rules for a user and/or network device type to determine if the commands are permitted based on the predicted modelled configuration of the network device.

According to a second aspect of the present invention there is provided a system for network device configuration management, comprising: a processor; a user input component for receiving a set of user commands for configuration of a network device; a modelling component for retrieving a syntactic model of a network device configuration interface for a network device type and generating a modelled configuration of a current configuration of the network device; a model-based configuration prediction component for predicting the effect of the user command on the modelled configuration to generate a predicted modelled configuration; and a rule component for applying rules for a user and/or network device type to determine if the command is permitted based on the predicted modelled configuration of the network device.

According to a third aspect of the present invention there is provided a computer program stored on a computer readable medium and loadable into the internal memory of a digital computer, comprising software code portions, when said program is run on a computer, for performing the method of the first aspect of the present invention.

Viewed from a further aspect, the present invention provides a computer program product for network device configuration management, the computer program product comprising a computer readable storage medium readable by a processing circuit and storing instructions for execution by the processing circuit for performing a method for performing the steps of the invention.

BRIEF DESCRIPTION OF THE DRAWINGS

The present invention will now be described, by way of example only, with reference to preferred embodiments, as illustrated in the following figures.

DETAILED DESCRIPTION

Figure 1:
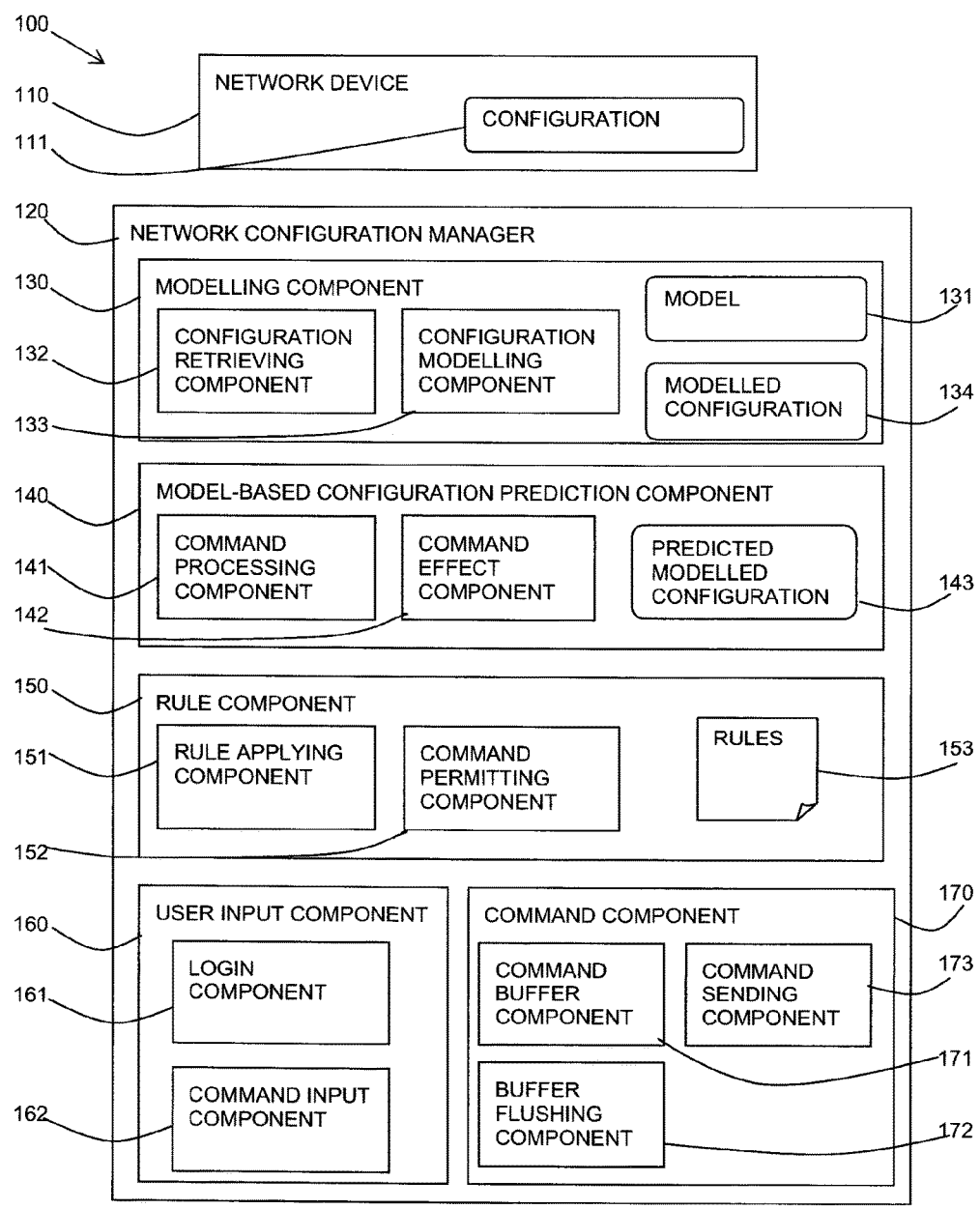
FIG. 1 is a block diagram of an embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and a system are described which make use of a complete or partial syntactic model of a network device configuration interface (i.e. the commands that could be issued) and a model of the current network device configuration to predict in near real-time the effect on the network device configuration of the commands that the user enters. By applying restrictive rules against the predicted configuration rather than against the text commands typed by the user, a more precise and effective restriction of the user actions can be achieved, with easier rule definition for the administrator.

A system administrator may use a graphical user interface (GUI) or other mechanism to define a set of rules which describe the ways in which the user may influence the configuration. These rules may be associated with sets of network devices (based on vendor, family, role in the network, etc.) and sets of users (based on group membership) using the GUI.

Examples of some types of rules which might be defined include the following (this is not an exhaustive list):

Sections of the configuration which the user can/cannot change;

Configuration patterns which are disallowed, e.g. patterns representing simple restrictions such as "cannot enable CDP" (Cisco Discovery Protocol, Cisco is a trademark of Cisco Systems, Inc.) or patterns representing more complex scenarios interrelating different parts of the configuration such as "existing ACLs (access control lists) which are in use on one or more interfaces cannot be edited";

Restrictions based on the network operator's internal policies, e.g. "VLAN (virtual local area network) 5 is reserved and only the network administrator can configure it"; and Defined limits within which parameters can be altered (e.g. prevent the bandwidth of an interface being set greater than 1 Mbps).

When the user initiates a configuration line interface (CLI) session with a network device, the described configuration manager retrieves a copy of the current configuration and converts it to an internal representation format. As the user types a command into the CLI session, the system uses a syntactic and behavioural model to predict the way in which the network device configuration will be changed by that command. At the point where the user initiates the process of sending the buffer of commands to the device, the relevant rules are applied to the predicted configuration to determine whether to permit the commands to be sent.

Various mechanisms may be employed to improve the performance of the rule matching, such as pre-computing the aggregate effect of multiple relevant rules for each device set and user group; and pre-processing the model to produce a format optimized for fast searching, such as a binary tree.

In the described method and system, user restrictions are based on the end configuration state of the network device, rather than the commands issued to reach that state. In many instances, there are multiple different ways in which the same effect can be achieved: different sets of commands which in combination have the same result, in many instances depending on other things which have previously been configured on the device, and made even more complex by abbreviations and alternate command spellings on the device configuration interface. It is extremely complex to craft text filtering rules which can block the undesirable set of commands without also blocking commands that the user must have access to in order to perform their tasks. By restricting the end configuration state instead, the administrator does not need to worry about the many paths which could result in that end state.

Referring to FIG. 1, a block diagram shows an embodiment of the described system 100.

A network device 110 is a device which forms part of a communication network and which has a configuration 111 which are settings which determine how the network device 110 operates.

A network configuration manager 120 is provided which enables configuration of network devices 110. Existing network configuration managers 120 include as an example IBM Tivoli Netcool Configuration Manager (ITNCM). The described network configuration manager 120 has additional functionality as described further below.

The network configuration manager 120 may include a modelling component 130 for providing and using a model 131 in the form of a syntactic and behavioural model of a network device configuration interface for a type of network device 110. The model 131 may contain as part of its structure a tree representation of all possible keyword commands that can be issued to that network device 110.

The modelling component 130 may include a configuration retrieving component 132 for retrieving a copy of the current network device 110 configuration 111 and a configuration modelling component 133 to populate the model and hence derive a modelled configuration 134 for the current configuration of the network device 110.

The network configuration manager 120 may also include a model-based configuration prediction component 140 including a command processing component 141 for processing a command input by a user and a command effect component 142 for determining the effect of the command on the network device 110 configuration 111 thus generating a predicted modelled configuration 143 version of the modelled configuration 134.

The network configuration manager 120 may also include a rule component 150 including a rule applying component 151 for applying predefined rules 153 regarding permissions of a user, the type of network device 110 and other criteria. The rules 153 may be applied by the rule applying component 151 to the predicted modelled configuration 143. A command permitting component 152 may be provided which allows or denies a command to the network device 110.

The network configuration manager 120 may include a user input component 160 including a login component 161 for a user to login to a configuration session for a network device 110. The user input component 160 may also include a command input component 162 for a user to input proposed commands which are modelled by the modelling prediction component 140.

The network configuration manager 120 may also include a command component 170 which may include a command buffer component 171 for buffering commands input by the user until the commands are allowed or denied by the command permitting component 152. A buffer flushing component 172 may be provided for flushing commands from a buffer if they are denied. A command sending component 173 may be provided for sending commands to the network device 110 if they are allowed.

Figure 2:
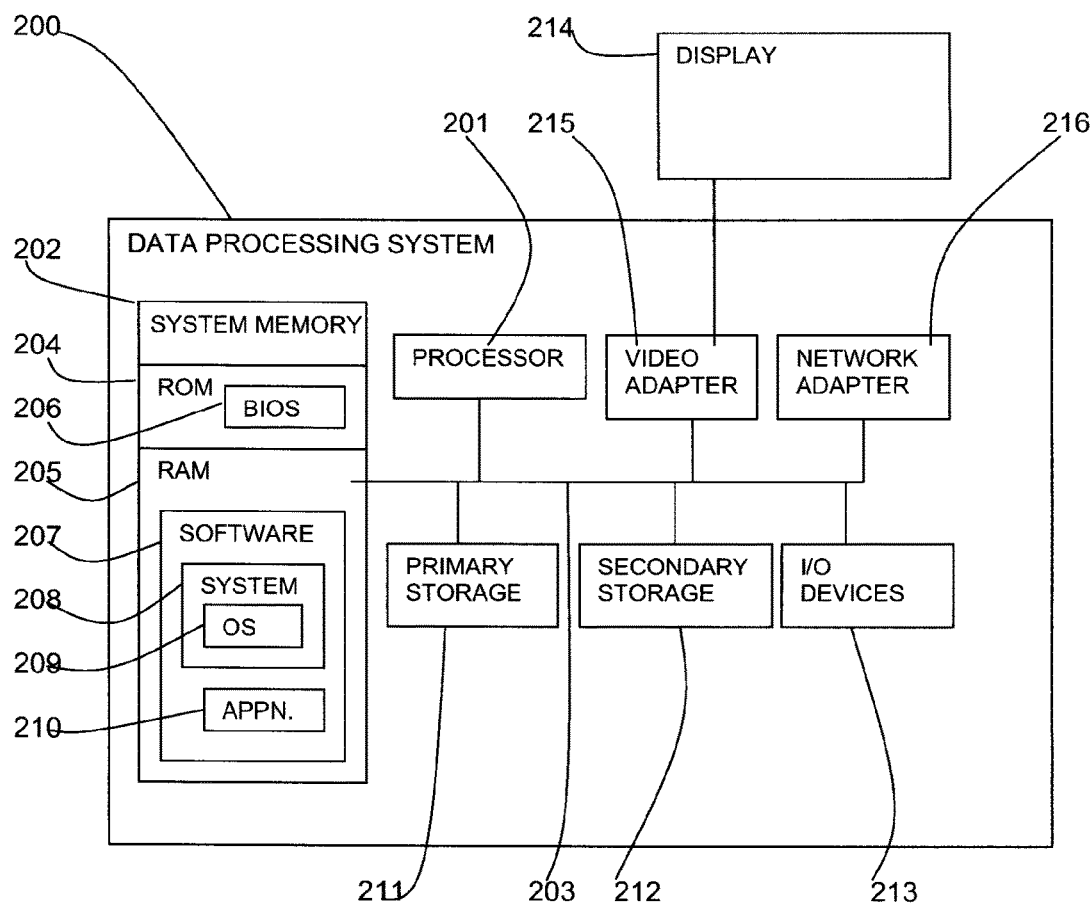
FIG. 2 is a block diagram of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
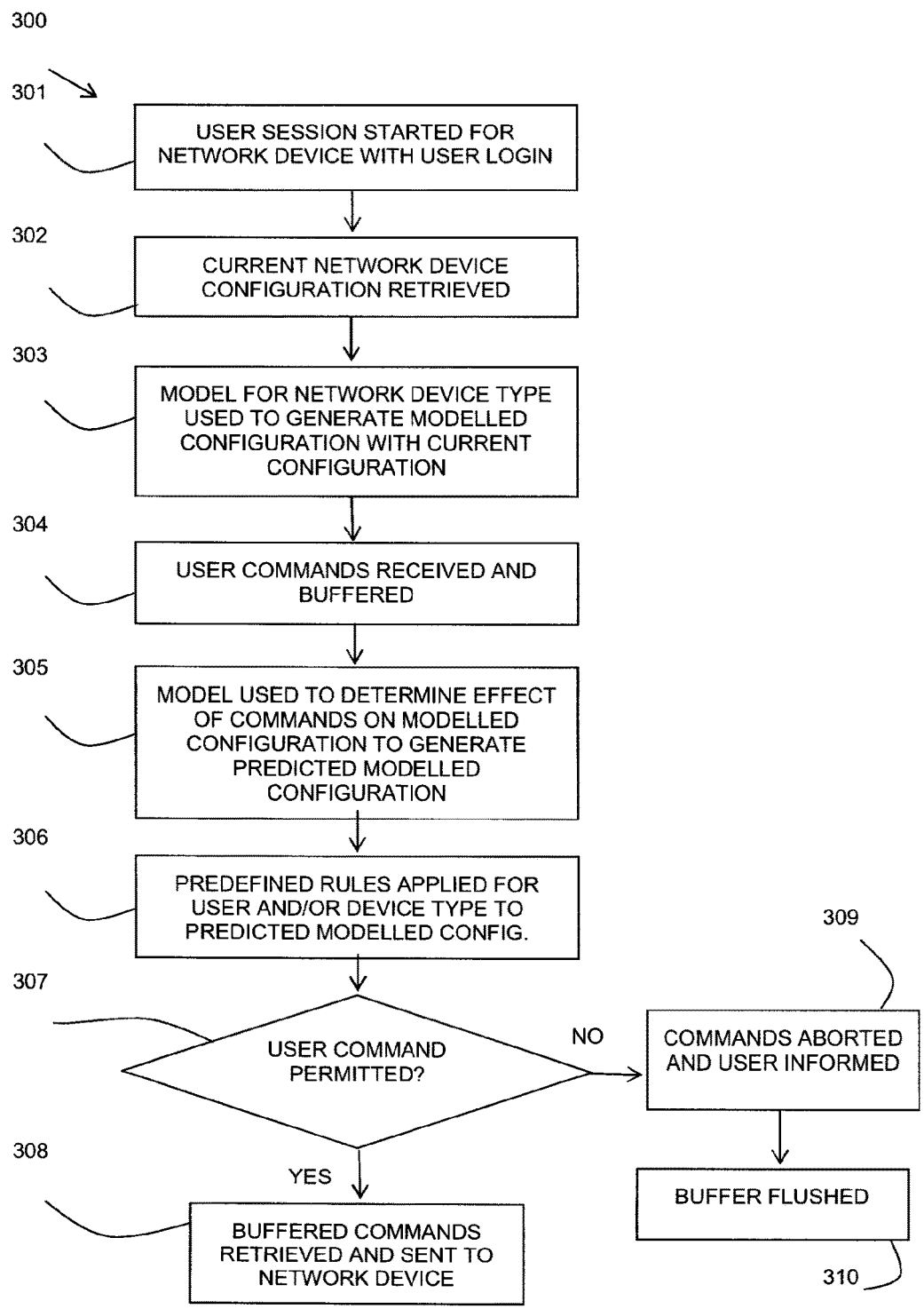
FIG. 3 is a flow diagram of an embodiment of a method in accordance with the present invention.

Referring to FIG. 3, a flow diagram 300 shows the described method as carried out by a modified network device configuration manager. Before the process may start, a set of rules may be defined for a user and/or type or model of network device. A general syntactic and behavior model is generated for a network device type or model.

A user session may be started 301 for a network device with a user login identifying the user. The current network device configuration may be retrieved 302 and a model for the network device type may be used 303 to generate a modelled configuration of the current configuration.

A set of user commands for the network device may be received and buffered 304.

The model may be used 305 to determine the effect of the commands on the modelled configuration to generate a predicted modelled configuration.

Predefined rules may be applied 306 for the user and/or the network device type to the predicted modelled configuration. It is determined 307 if the user command is permitted by the rules. If they are not permitted, the commands may be aborted 309 and the buffer may be flushed 310 to clear the dis-allowed commands. If the commands are permitted by the rules, the buffered commands may be retrieved 308 and sent to the network device.

Figure 4:
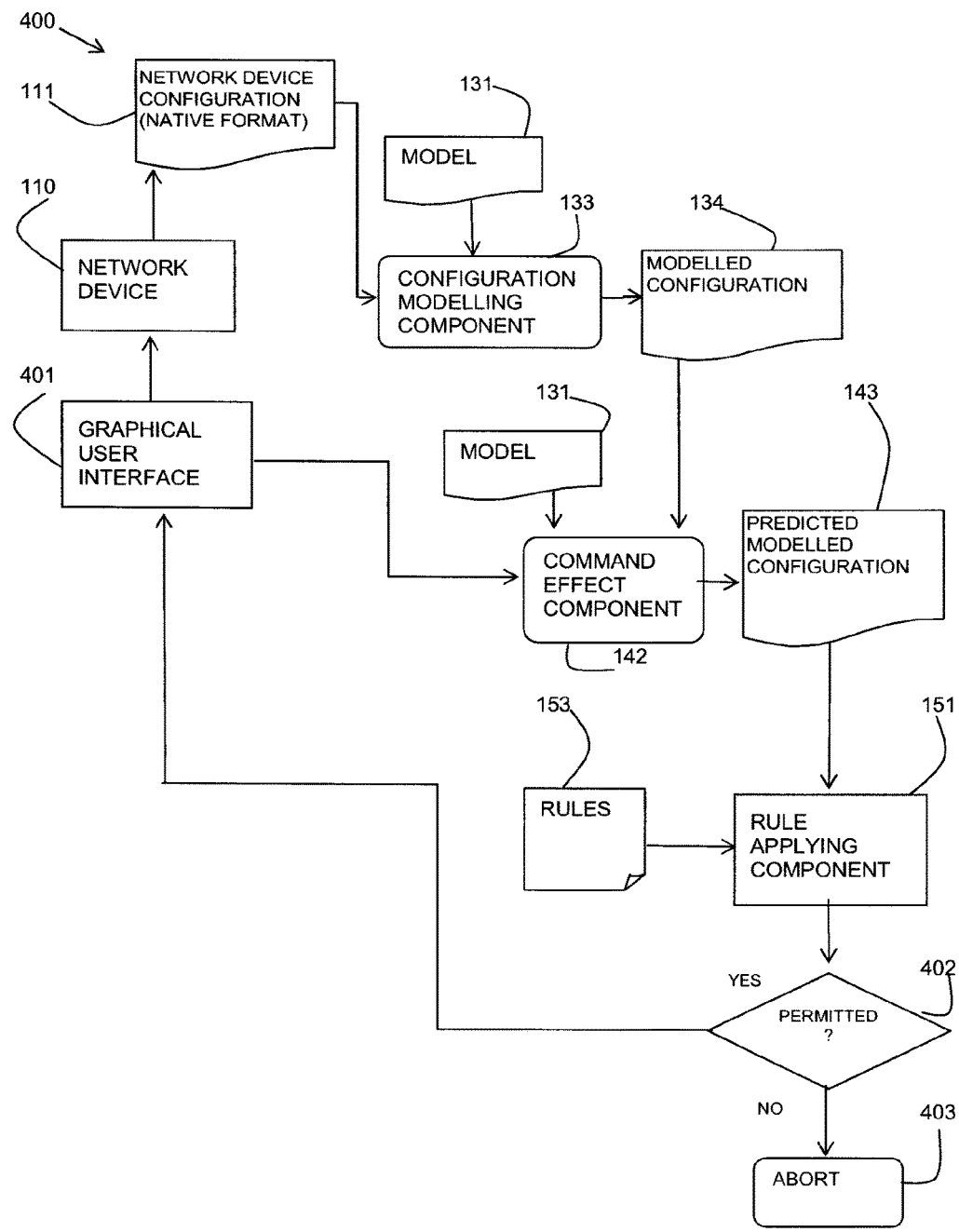
FIG. 4 is a schematic diagram showing an embodiment of a method in accordance with the present invention.

Referring to FIG. 4, a schematic diagram 400 shows an example embodiment of the operation of a network device configuration. The elements already introduced in FIG. 1 have the same reference number.

A user may initiate direct configuration of a network device 110 via a graphical user interface 401 of a network configuration manager or a component acting in conjunction with a network configuration manager (referred to as the system) by opening a session and logging in.

The system retrieves a copy of the current network device configuration 111 in its native format, and using the syntactic and behavioral model 131 (hereafter referred to as the model) of the configuration interface for that specific device type, a configuration modelling component 133 creates a modelled configuration 134. Further details of the modelled configuration 134 are given below.

The user may enter one or more commands in the interactive session via the graphical user interface 401, which the system buffers preparatory to sending to the network device 110. The system may use the model 131 (which contains as part of its structure a tree representation of all possible keyword commands that can be issued to that device) to disambiguate and expand the commands entered by the user. So for example, "int eth 0" is expanded to "interface ethernet 0".

The system uses the model 131 to determine the effect of the newly typed commands upon the modelled configuration 134 to generate a predicted modelled configuration 143 using the command effect component 142. Further details of the command effect component 142 are given below.

The system carries out rule application using the rule applying component 151 applying the appropriate set of rule-based constraints of predefined rules 153 against the new predicted modelled configuration 143. Rules 153 are selected from the full library of rules based on the group memberships of the user, the type and model of device, and other criteria. Further details of the rule applying component 151 are given below.

The outcome after all rule processing is complete is assessed, and if the user is permitted 402 to make this change to the network device 110, then the system will submit the commands to the network device 110. If the change is not permitted then the command is aborted 403 and the user is informed that they are not allowed to send those commands and the buffer is flushed.

Modelled Configuration

The network device configuration may contain a series of strings, for example:

```
interface GigabitEthernet0/1
    ip address 10.1.1.1 255.255.255.252
    ip access-group 1 in
    ip router isis
    duplex auto
    speed auto
    service-policy input NEWPOL
end.
```

The syntactic and behavioral model (the model) may be a combination of code and metadata which allows the system to express the configuration in a structured format, which can then more readily be rendered for viewing and manipulated in the system, for example:

```
<interface>
    1. <GigabitEthernet>
        2. <ARG.001>0/1</ARG.001>
        3. <ip>
            1. <address>
                a. <ARG.001>10.1.1.1</ARG.001>
                b. <ARG.002>255.255.255.252</ARG.002>
            2. </address>
            3. <access-group>
                a. <ARG.001>1</ARG.001>
                b. <in/>
            4. </access-group>
            5. <router>
                a. <isis/>
            6. </router>
        4. </ip>
        5. <duplex>
            1. <auto/>
        6. </duplex>
        7. <speed>
            1. <auto/>
        8. </speed>
        9. <service-policy>
            1. <input>
                a. <ARG.001>NEWPOL</ARG.001>
            2. </input>
        10. </service-policy>
    11. </GigabitEthernet>
</interface>
```

Command Effect Component

When the user types a set of commands into the network device interactive session, the system may first process the entered commands using the command portion of the syntactic model to identify and disambiguate the commands entered. The system may then use the model to determine the effect of these commands upon the stored structured configuration. The model may relate the command syntax to the configuration syntax where these differ (for example, where the commands are human-readable but the configuration is stored as a table of integers), and expresses the overall effect of the set of commands on the configuration. In some cases this is fairly obvious, where a given command string is entered directly into the configuration file, but in many cases a single command may result in distinct changes to several parts of the configuration. The set of commands entered can interact with and modify each other in complex ways which the model must take into account in determining the overall effect on the configuration. The model allows the system to determine which parts of the configuration must be amended, and what the overall change in each part should be, based on the holistic set of commands being processed.

In a simple example, the command "no policy-map NEWPOL" will result in the deletion of the complete configuration section represented in the modelled configuration as shown:

```
<policy-map>
    1. <ARG.001>NEWPOL</ARG.001>
    2. <class>
        3. <ARG.001>fred</ARG.001>
        4. <drop/>
    5. </class>
</policy-map>
```

The system may process the command string using the model for reference, and as a result it may add, modify or delete one or more sections in the structure representing the configuration. So in the example above, if the user enters a command sequence:

conf t
    #int gi 0/1
    #dup fu

The system will use the model to disambiguate and expand these to:

interface GigabitEthernet 0/1
    duplex full

And will then use the model to look up which parts of the modelled configuration are affected by that command, and update appropriately, in this case a modify:

```
<interface>
    1. <GigabitEthernet>
        . . .
        2. <duplex>
            3. <full/>
        4. </duplex>
        . . .
```

If there are dependencies on other parts of the configuration, these will also be implemented (adds, modifies and deletes of other branches as appropriate). Command sequences which are invalid based on the syntax and interrelations codified in the model may be rejected.

The result is a predicted modelled configuration for the network device, which represents the system's prediction of what the device would do if it received those commands, expressed in the modelled configuration format.

Rule Applying Component

Rules may be entered using the GUI and stored in the system. The subset of rules that may be applied in any circumstance may be determined by the system based on the permissions of the user, the type of device, and other relevant criteria (such as potentially the network role of the device or a manual administrative process of relating rules to devices).

These rules may be expressed in terms of the modelled configuration as shown above, and could be as simple as "this user cannot change any configuration branch which relates to a gigabit Ethernet interface", or could be very complex, having dependencies upon other parts of the configuration, such as the examples below.

The rules may be executed against the complete predicted configuration, which allows the administrator to express complex relationships between different parts of the configuration, and critically allows the system not only to assess the impact of the commands the user actually typed, but to do so within the context of the pre-existing configuration state (i.e. things which the user did not type in).

EXAMPLES

1. The user cannot change the duplex setting on a gigabit Ethernet interface (but can change it on a fast Ethernet interface).
2. The user cannot change the duplex setting on a gigabit Ethernet interface if that interface is in the 172.2.x.x subnet.
3. For example on a router the following command adds a line to the configuration.
   access-list 99 permit any In this example, a new configuration line may be added to the configuration. However, this change to the configuration will not result in a change to the behavior of the network device. This command merely creates a facility that can be used elsewhere in the configuration. To remove this line from the configuration the user may enter the command.
   no access-list 99

This command will remove the complete access list from configuration. However, no warning will be given if the facility is referenced elsewhere in the configuration, the configuration will simply be left with an orphaned referenced to the facility. The device behavior will change as soon as the command is issued. In this example, this could potentially lead to a security exposure.

A key requirement for and hence a key advantage of the model based command restriction mechanism described herein, is that the model provides the linkages between elements in the configuration. Understanding the linkages between the configuration elements provides the ability to understand how the application of a command will affect the behavior of the network device.

In the example given, only one line of the configuration of the device was changed but the meaning of many lines in the configuration may have been impacted. Utilizing the model it is possible to create policy rules that prevent the execution of commands that would generate orphaned references.

Take the following configuration snippet:

```
!
  class-map match-all fred
    match ip dscp af11
!
!
```

```
policy-map NEWPOL
  class fred
    1. drop
!
interface GigabitEthernet0/1
  ip address 10.1.1.1 255.255.255.252
  ip access-group 1 in
  ip router isis
  duplex auto
  speed auto
  service-policy input NEWPOL
end
!
!
access-list 1 permit 10.0.0.0
access-list 1 permit 172.20.3.15
!
access-list 2 permit 10.0.0.0
access-list 2 deny 172.20.3.14
```

Rules may be constructed which enforce the following: the user is not permitted to execute any commands that will change service policies or ACLs that are in use on any interface so policy map NEWPOL, class-map fred and ACL access-list 1 cannot be edited, but they are permitted to change access-list 2.

The state of the art for user configuration command restriction may be defined as follows:

Let S be the set of all device configuration states;

Let C be the set of all valid and complete command strings for the device.

At present, user commands are restricted by implementing a function:

$f: C \rightarrow \{true, false\}$ where:

$f(c) = true$, where c is a permitted command; and $f(c) = false$ where c is a prohibited command.

In the described method, rather than perform a purely syntactic restriction as above, the current and modelled future state are taken into account as follows.

Define a function:

$g: C, S \rightarrow S$ defined by:

$g(c,s)$ = the configuration state of a device after command c is applied to configuration state s.

Then define function:

$h: S \rightarrow \{true, false\}$ defined as:

$h(s) = true$ if s is an acceptable configuration state $h(s) = false$ otherwise.

Now, when a command c is submitted, compute $h(g(c,s))$ and use the output to determine whether the command will be permitted.

Network device configuration management may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for network device configuration management, comprising a processing circuit and the processing circuit for performing the method comprising:
    receiving, by the processing circuit, a set of user commands for configuration of a network device;
    retrieving, by the processing circuit, a syntactic model of a network device configuration interface for a network device type and generating a modelled configuration of a current configuration of the network device, wherein syntactic model include combination of code and metadata to express the network device configuration in a structured format, and wherein the modelled configuration is a representation of hardware;
    predicting, by the processing circuit, an effect of the user commands on the modelled configuration to generate a predicted modelled configuration, wherein the predicted modelled configuration is distinct from the syntactic model and wherein the predicted modelled configuration is a representation of hardware after implementation of the user commands; and
    applying, by the processing circuit, rules for a user and/or network device type to determine if the commands are permitted based on the predicted modelled configuration of the network device.

2. The method as claimed in claim 1, wherein: predicting, by the processing circuit, the effect of the user commands predicts in near real-time the effect on the network device configuration of a command that the user enters.

3. The method as claimed in claim 1, including: defining, by the processing circuit, a set of rules comprising relationships between a set of network device types, a set of users issuing commands, and the set of configuration changes that they are permitted to make.

4. The method as claimed in any claim 1, including: buffering, by the processing circuit, received user commands until the user commands are permitted or denied.

5. The method as claimed in claim 1, wherein the syntactic model is used to disambiguate and expand a command entered by a user and includes a tree representation of all possible keyword commands that can be issued to the network device type.

6. The method as claimed in claim 1, wherein the syntactic model is a combination of code and metadata which allows a configuration of a network device to be expressed in a format that can be rendered for viewing and manipulation.

7. The method as claimed in claim 1, wherein predicting the effect of the user commands includes: relating, by the processing circuit, the command syntax to the configuration syntax where these differ; and expressing, by the processing circuit, the effect of each command on the configuration including mapping each command keyword to a model branch or branches that it has an effect upon, and expressing, by the processing circuit, any translations that need to be carried out.

8. The method as claimed in claim 1, wherein the predicted modelled configuration for the network device represents a prediction, by the processing circuit, of the configuration the network device would adopt if it received the user commands, expressed in a structured format.

9. A system for network device configuration management, comprising:
    a processor;
    a user input component executed by the processor receiving a set of user commands for configuration of a network device;
    a modelling component executed by the processor retrieving a syntactic model of a network device configuration interface for a network device type and generating a modelled configuration of a current configuration of the network device, wherein syntactic model include combination of code and metadata to express the network device configuration in a structured format, and wherein the modelled configuration is a representation of hardware;
    a model-based configuration prediction component executed by the processor predicting an effect of the user command on the modelled configuration to generate a predicted modelled configuration, wherein the predicted modelled configuration is distinct from the syntactic model and wherein the predicted modelled configuration is a representation of hardware after implementation of the user commands; and
    a rule component for applying rules executed by the processor a user and/or network device type to determine if the command is permitted based on the predicted modelled configuration of the network device.

10. The system as claimed in claim 9, wherein: the model-based configuration prediction component executed by the processor predicting the effect of the user commands predicts in near real-time the effect on the network device configuration of the series of commands that the user enters.

11. The system as claimed in claim 9, including: a rule defining component executed by the processor defining a set of rules comprising relationships between a set of network device types, a set of users issuing commands, and a set of permitted configuration model updates.

12. The system as claimed in claim 9, including: a command buffer component executed by the processor buffering the received user commands until the proposed configuration model change is permitted or denied.

13. The system as claimed in claim 9, wherein the syntactic model is used to disambiguate and expand a command entered by a user and includes a tree representation of all possible keyword commands that can be issued to the network device type.

14. The system as claimed in claim 9, wherein the syntactic model is a combination of code and metadata which allows a configuration of a network device to be expressed in a format that can be rendered for viewing and manipulation.

15. The system as claimed in claim 9, wherein the model-based configuration prediction component for predicting the effect of the user command includes:
    relating the command syntax to the configuration syntax where these differ; and
    expressing the effect of each command on the configuration including mapping each command keyword to a model branch or branches that it has an effect upon, and expressing any translations that need to be carried out.

16. The system as claimed in claim 9, wherein the system is part of a network configuration manager.

17. A computer program product for network device configuration management, the computer program product comprising a non-transitory computer readable storage medium readable by a processing circuit and storing instructions for execution by the processing circuit for performing a method comprising:

receiving, by the processing circuit, a set of user commands for configuration of a network device;

retrieving, by the processing circuit, a syntactic model of a network device configuration interface for a network device type and generating a modelled configuration of a current configuration of the network device, wherein the syntactic model is distinct from the modelled configuration, wherein syntactic model include combination of code and metadata to express the network device configuration in a structured format, and wherein the modelled configuration is a representation of hardware;

predicting, by the processing circuit, an effect of the user commands on the modelled configuration to generate a predicted modelled configuration, wherein the predicted modelled configuration is distinct from the syntactic model and wherein the predicted modelled configuration is a representation of hardware after implementation of the user commands; and applying, by the processing circuit, rules for a user and/or network device type to determine if the commands are permitted based on the predicted modelled configuration of the network device.

* * * * *